United States Patent [19]

Han

[11] 3,952,846
[45] Apr. 27, 1976

[54] ELECTROSTATICALLY COOLED BRAKE

[75] Inventor: Chung Ping Han, South Bend, Ind.

[73] Assignee: The Bendix Corporation, South Bend, Ind.

[22] Filed: June 11, 1973

[21] Appl. No.: 368,784

[52] U.S. Cl. ............................. 188/264 R; 62/3; 165/1; 165/86; 188/71.6; 192/113 R
[51] Int. Cl.² ..................................... F16D 65/84
[58] Field of Search .......... 188/71.6, 264 R, 264 A, 188/264 AA; 192/113 R; 62/3; 165/1, 2, 86

[56] References Cited
UNITED STATES PATENTS

| | | | |
|---|---|---|---|
| 2,423,882 | 7/1947 | Frank | 188/71.5 |
| 3,077,743 | 2/1963 | Castro et al. | 62/3 |
| 3,224,485 | 12/1965 | Blomgren, Sr. et al. | 432/24 |
| 3,224,497 | 12/1965 | Blomgren, Sr. et al. | 165/2 |

*Primary Examiner*—George E. A. Halvosa
*Attorney, Agent, or Firm*—Gordon H. Chenez; William N. Antonis

[57] ABSTRACT

Apparatus for cooling a disc brake or the like wherein a plurality of electrically conductive probes are arranged in circumferentially spaced-apart relationship radially outwardly from frictionally engageable disc portions of the brake and adapted to direct a high voltage, low amperage electrical flow to the frictionally engageable disc portions which are of opposite electrical polarity and separated from the probes by a predetermined air gap. A suitable high voltage electrical source is connected to the probes and the frictionally engageable disc portions to establish electrostatic discharge across the air gap.

2 Claims, 2 Drawing Figures

ELECTROSTATICALLY COOLED BRAKE

BACKGROUND OF THE INVENTION

The cooling effect derived from disposing an elecrostatic discharge upon a heated body is a known phenomenon as evidenced by various publications including U.S. Pat. No. 3,224,485 to Oscar C. Blomgren, Sr. et al. It appears that little effort has been expended to develop the concept beyond experimental laboratory use.

The problem of overheating of high capacity disc brakes is well known, as for example, aircraft multiple disc brakes which must be capable of withstanding great quantities of heat generated by engagement of the friction discs in the course of braking relatively heavy, fast moving, aircraft during ground operation and which are normally enclosed in a wheel to such an extent that rapid dissipation of heat therefrom cannot occur. It will be recognized that excessive quantities of heat and resulting high temperatures imposed on the disc brake structure has the effect of rapid deterioration of the brake with possible disastrous results on the aircraft as well as crew members and/or passengers carried thereby. Various mechanisms have been proposed to cool high capacity multiple disc aircraft brakes as, for example, that disclosed in U.S. Pat. Nos. 3,403,759 issued Oct. 1, 1968 and 3,251,437 issued May 17, 1966. However, such prior art cooling mechanisms have certain characteristics which are not entirely satisfactory including space requirements, weight and complexity as well as manufacturing cost.

It has been found that the temperature of a multiple disc brake or portions thereof may be controlled to a significant extent under adverse braking conditions with a relatively compact, light weight and effective arrangement of simple electrical components whereby the brake components may be subjected to an electrostatic discharge to improve dissipation of heat therefrom and reduce operating temperatures thereof accordingly.

SUMMARY OF THE INVENTION

It is an object of the present invention to provide a simple and efficient network of electrical components including a plurality of electrical probes and an electrical source of high voltage, low amperage connected thereto particularly adapted for use in a multiple disc brake environment whereby an electrostatic discharge imposed on the disc brake provides a cooling effect thereon.

It is another object of the present invention to provide electrostatic cooling apparatus for use in a brake subject to extreme heat and enclosed to a significant extent by a wheel or the like.

DESCRIPTION OF THE PREFERRED EMBODIMENT

Figure 1:
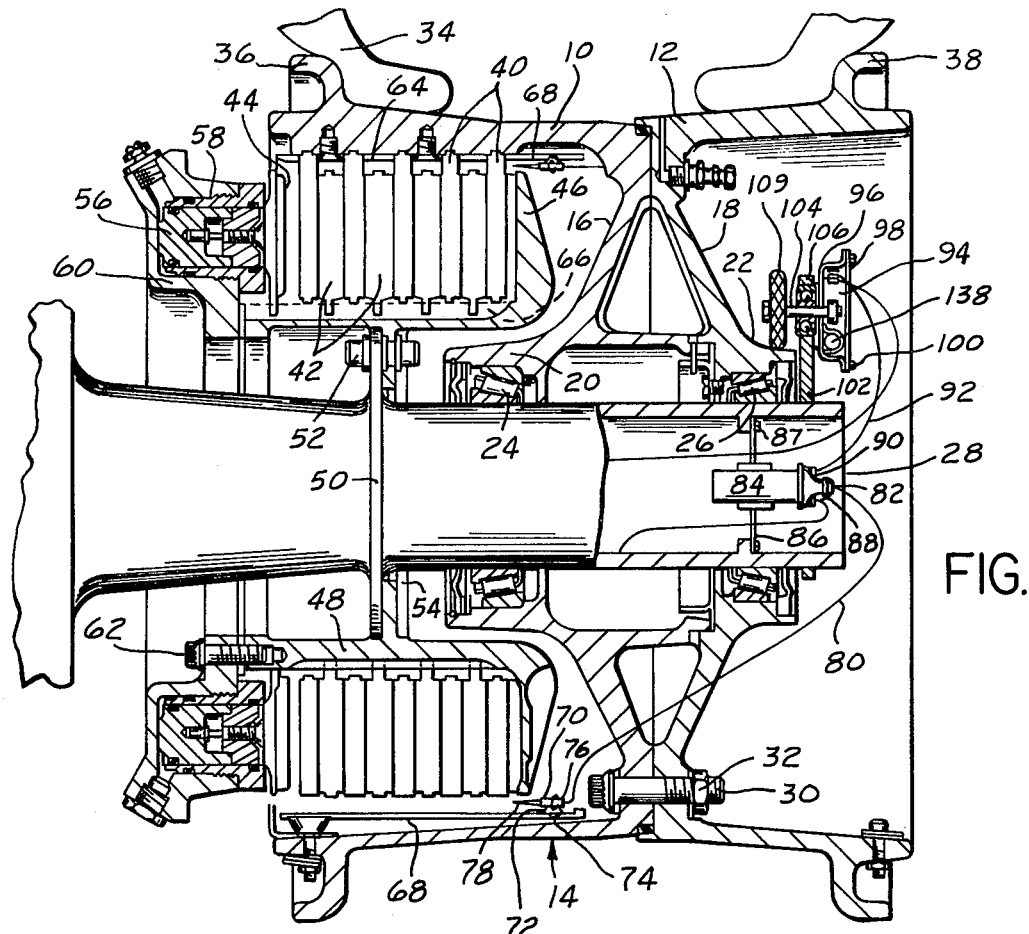
FIG. 1 is a schematic representation in partial section of a conventional aircraft wheel and multiple disc brake therefor embodying the present invention.

Referring to FIG. 1, numerals 10 and 12 designate inboard and outboard annular wheel portions, respectively, of a conventional aircraft wheel generally indicated by 14. The wheel portions 10 and 12 are provided with radially inwardly extending web or arm portions 16 and 18, respectively, which terminate in associated hub portions 20 and 22. The hub portions 20 and 22 are adapted to rotate on annular bearing members 24 and 26, respectively, which are suitably mounted on a hollow stub axle 28 extending from an aircraft landing gear wheel support, not shown.

The inboard and outboard wheel portions are fixedly secured together by a plurality of circumferentially spaced-apart bolts 30 extending through arm portions 16 and 18 and threadedly engaged by associated nuts 32. An inflatable tire 34 is retained on wheel 14 by wheel flanges 36 and 38 integral with wheel portions 10 and 12, respectively.

A plurality of interleaved annular rotor and stator discs 40 and 42, respectively, are adapted to be compressed between an annular pressure plate 44 and a backing plate 46 which backing plate 46 is integral with an annular torque member 48. The torque member 48 is fixedly secured to a mounting flange 50 integral with axle 28 and extending radially outwardly therefrom. A plurality of circumferentially spaced-apart bolt and nut assemblies generally indicated by 52 and plate member 54 serve to secure torque member 48 in position on flange 50.

The pressure plate 44 is engaged by a plurality of circumferentially spaced-apart fluid pressure actuated pistons 56 slidably carried in associated cylinders 58 in an annular carrier member 60 which is fixedly secured to torque member 48 by a plurality of circumferentially spaced-apart bolts 62 threadedly engaged with torque member 48. The cylinders 58 are connected via suitable passages, not shown, to a conventional controlled source of pressurized fluid, not shown, by means of which pistons 56 are pressurized.

The rotor discs 40 are slidably keyed for axial movement of a plurality of circumferentially spaced-apart slotted members 64 fixedly secured to inboard wheel portion 10. The stator discs are slidably keyed for axial movement to a plurality of circumferentially spaced-apart slotted members 66 fixedly secured to torque member 48.

A conventional annular heat shield 68 located radially outwardly from rotor and stator discs 40 and 42 is fixedly secured to inboard wheel portion 10 to reduce heat transfer radially outwardly from the discs 40 and 42 to the tire 34.

The brake is applied as a result of pressurization of pistons 56 which urge pressure plate 44 toward backing plate 46 thereby compressing rotor and stator discs 40 and 42 together to frictionally oppose rotation of wheel 14. The frictional resistance generated by the rubbing surfaces of rotor and stator discs 40 and 42 is transformed to heat which, in the case of high capacity aircraft disc brakes, tends to raise the operating temperatures of the rotor and stator discs 40 and 42 as well as adjacent brake structure which operating temperatures cannot be permitted to exceed a predetermined limit if rapid deterioration of the discs 40 and 42 and resulting brake failure is to be avoided.

Figure 2:
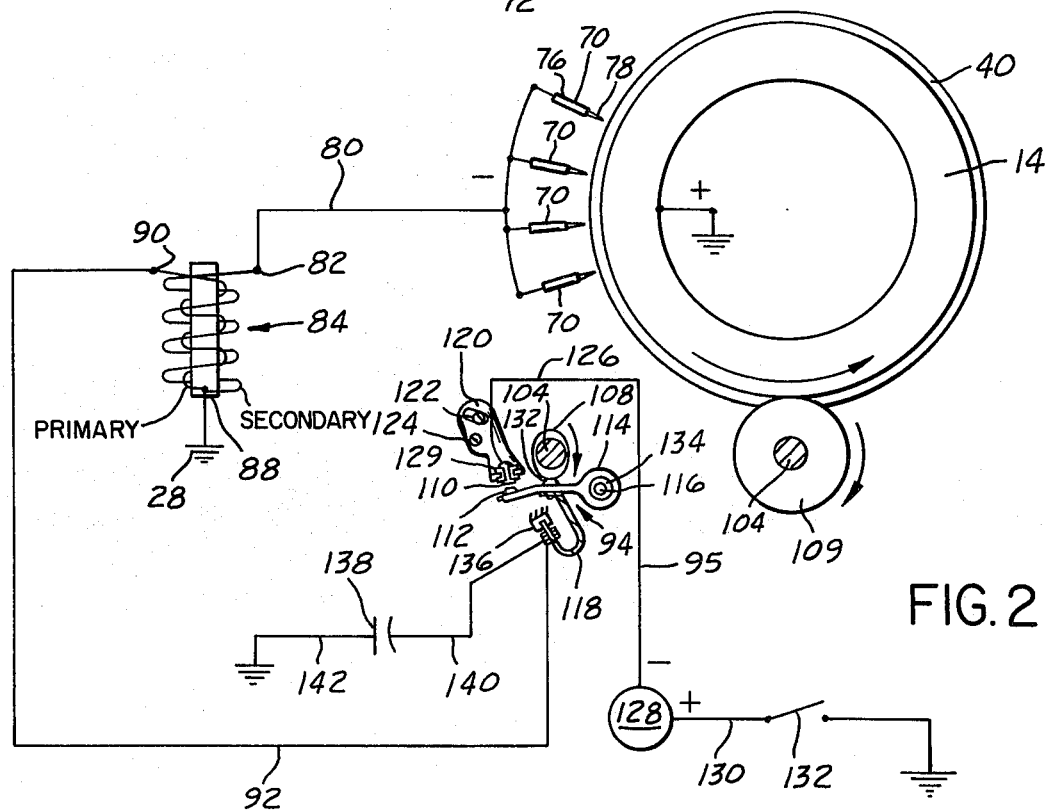
FIG. 2 is a schematic representation of the present invention showing one form which the electrical components thereof may take.

Referring to FIGS. 1 and 2, the present invention includes a plurality of circumferentially spaced-apart electrodes or electrically conductive probes 70 as, for example, six or eight, only one of which is shown in FIG. 1, suitably secured by support members 72 fixedly secured to a suitable support such as heat shield 68 by rivets or other fastening members 74. The electrodes or probes 70 are each provided with an electrically insulated body portion 76 and a relativey sharply pointed electrical discharge member 78 extending therefrom in predetermined spaced-apart relationship to the adjacent radially outermost portion of the nearest rotor disc 40. The spaced relationship between rotor disc 40 and discharge member 78 is adequate to prevent electrical arcing therebetween. The electrodes or probes 70 are connected in parallel by a suitable wiring network including wire 80 to a high voltage terminal 82 of the secondary coil of a conventional coil member 84 which is mounted within axle 28 on a bracket 86 attached to axle 28. A second terminal of the secondary coil as well as one terminal 88 of the primary coil of coil member 84 is grounded to axle 28. The second terminal 90 of the primary coil of coil member 84 is connected via wire 92 to one terminal of an electrical breaker assembly generally indicated by 94, a second terminal of which breaker assembly is connected via wire 95 to a suitable DC power source. The breaker assembly 94 is suitably mounted in a container 96 having a cap 98 removably secured thereto as by screws 100. The container 96 is fixedly secured to a support member 102 which, in turn, is fixedly secured to axle 28. A shaft 104 rotatably mounted on antifriction ball bearing 106 suitably secured to support member 102 extends into container 96 and is provided with a cam member 108 fixedly secured thereto and rotatable therewith. The opposite end of shaft 104 is provided with driving wheel 109 fixedly secured thereto which frictionally engages hub portion 22 and is rotated thereby. The cam member 108 is engageable with breaker assembly 94 and serves to periodically open and close the same to thereby energize the coil member 84 as will be described.

Referring to FIG. 2, the above-described electrical network and associated mechanical components are shown in schematic form in entirety. It will be noted that preferably the electrical polarity of the various component members including probes 70 is as shown. However, it will be understood that the polarity of the component members and, in particular, probes 70 may be reversed from that shown without disturbing the continuity of the electrical network. The breaker assembly 94 is conventional in that it includes stationary and movable contact members 110 and 112, respectively. The movable contact member 112 is fixedly secured to an arm 114 which arm is pivotally secured to a fixed support 116 and biased into engagement with cam member 108 by a flexible spring member 118. The stationary contact 110 is secured to an adjustable support 120 provided with adjusting screw 122 and locking screw 124 to provide for gap adjustment between contacts 110 and 112. The stationary contact 110 is connected via a wire or lead 126 preferably to the negative terminal of a suitable electrical power source generally indicated by 128 which may be an aircraft engine driven electrical generator or storage battery of suitable voltage as for example 24 volts DC. The stationary contact 110 is electrically insulated from adjustable support by suitable non-conducting sleeve means 129. A positive terminal of the source 128 is connected via wire or lead 130 and switch 132 to common ground.

Wire or lead 92 is electrically connected to movable contact member 112 via spring member 118 and arm 114 which are electrically insulated from cam member 108, support 116 and container 96 by suitable non-conducting means 132, 134 and 136. A capacitor 138 is connected via wires or leads 140 and 142 to lead 92 and ground, respectively.

It will be understood that the cam member 108, breaker assembly 94 and coil member 84 may be replaced with a conventional high voltage transformer, not shown, suitably connected to be energized by source 128 and deliver a stepped up voltage to electrodes 70. It will be recognized that a high voltage transformer will supply a continuous voltage to electrodes 70 in contrast to the intermittent electrical energization produced by coil member 84.

In operation, application of the disc brake to retard rotation of wheel 14 during a landing or rejected take-off of a heavy, rapidly moving aircraft results in a rapid heating of the rotor and stator discs 40 and 42 with corresponding temperature increase thereof to the extent that progressive structural deterioration of the discs and subsequent mechanical failure of the same is likely to result. It has been observed that such a braking operation with subsequent aircraft taxiing can result in brake temperatures on the order of 2,000° F which the conventional disc brake cannot tolerate for any significant time period without a drastic reduction in operating life of the rotor and stator discs or concomitant brake failure.

Assuming that the above-mentioned overheated condition of the disc brake of FIG. 1 is encountered, the switch 138 may be closed by the aircraft operator or by automatic temperature responsive means, not shown, suitably connected to actuate the switch which establishes continuity to ground. As the wheel 14 rotates cam member 108, the movable contact 112 moves into and out of engagement with stationary contact 110 resulting in cyclical energization of the primary coil of coil member 84 which, in turn, generates an electrical potential in he secondary coil of coil member 84 which secondary coil is provided with sufficient turns relative to the turns of the primary coil to establish a preferred potential of approximately 20 KV. The electrical charge thus imposed on probes 70 via wire 80 creates an electrostatic discharge between probes 70 and rotor and stator discs 40 and 42 adjacent to probes 70 which has the effect of increasing dissipation of heat from the rotor and stator discs 40 and 42 thereby cooling the same causing a significant reduction in temperature thereof.

The reason or theory behind the effect created by directing an electrostatic discharge against a relatively hot object and the resulting cooling of the hot object is not fully understood. However, it appears that it may be due to the boundary layer of air adjacent the rotor and stator discs 40 and 42 which layer may normally act to impede dissipation of heat radially outwardly from the heated rotor and stator discs 40 and 42 particularly when the discs are extremely hot. The electrostatic discharge imposed on the boundary layer of air may act to change the characteristics of the latter thereby permitting heat to escape more readily from the rotor and stator discs 40 and 42.

It will be recognized that the above-described electrical network including probes 70 may be adapted for use in brake structure other than aircraft. For example, automobile or truck brakes which may be subject to excessive heating could be cooled in the same manner heretofore described.

I claim:

1. An electrostatically cooled brake for retarding movement of a rotatable wheel or the like comprising:
   a rotatable member provided with a first friction surface and operatively connected to a rotatable wheel for rotation therewith;
   a stationary member provided with a second friction surface adapted to frictionally engage said rotatable member to retard rotation thereof;
   actuating means operatively connected to one of said rotatable and stationary members for actuating the same to cause frictional engagement of said first and second friction surfaces;
   a source of electric power provided with negative and positive charge terminals;
   probe means electrically connected to one of said terminals and electrically charged accordingly and arranged in spaced apart relationship to said rotatable and stationary members;
   coil means operatively connected to said electrical connection between said probe means and said one terminal for increasing the voltage applied to said probe means;
   breaker means operatively connected to said electrical connection for intermittingly interrupting the electrical flow to said coil means;
   cam means operatively connected to said rotatable wheel and said breaker means for actuating said breaker means in response to rotation of said wheel; and
   conductor means operatively connecting the other of said terminals to said rotatable and stationary members for electrically charging said other terminal accordingly to establish an electrical potential and corresponding electrostatic discharge between said probe means and said rotatable stationary members to effectively reduce the temperature of said rotatable and stationary members.

2. An electrostatically cooled brake as claimed in claim 1 wherein:
   said operative connection between said cam means and said rotatable wheel includes a rotatable shaft and a driving member connected to the shaft and said wheel for rotating said shaft and thus said cam.

* * * * *